United States Patent
Dixon (10) Patent No.: US 6,607,663 B1
(45) Date of Patent: Aug. 19, 2003

(54) PORTABLE AND MULTI-STAGE FILTRATION DEVICE FOR REMOVAL OF PERCHLORETHYLENE FROM DRY CLEANING WASTEWATER

(76) Inventor: Cameron Dixon, 2313 Delaware Ave., Flint, MI (US) 48506

( * ) Notice: Subject to any disclaimer, the term of this patent is extended or adjusted under 35 U.S.C. 154(b) by 0 days.

(21) Appl. No.: 10/057,200

(22) Filed: Jan. 25, 2002

(51) Int. Cl.[7] .................................................. C02F 9/00
(52) U.S. Cl. ................ 210/195.2; 210/196; 210/257.2; 210/258; 210/259; 210/266
(58) Field of Search .............. 210/195.1, 195.2, 210/196, 257.2, 259, 266, 258

(56) References Cited

U.S. PATENT DOCUMENTS

| | | | |
|---|---|---|---|
| 4,086,705 A | 5/1978 | Wehr | 34/26 |
| 4,281,465 A | 8/1981 | Zimmermann et al. | 34/26 |
| 4,513,590 A | 4/1985 | Fine | 68/18 |
| 4,581,133 A | 4/1986 | Tomes | 210/90 |
| 4,780,214 A | 10/1988 | Kohler | 210/774 |
| 4,788,776 A | 12/1988 | Fuhring et al. | 34/76 |
| 4,793,938 A | * 12/1988 | Dayton | 210/774 |
| 4,938,845 A | 7/1990 | Kohler | 202/169 |
| 4,954,222 A | 9/1990 | Durr et al. | 202/176 |
| 5,195,252 A | 3/1993 | Yamada et al. | 34/26 |
| 5,223,126 A | 6/1993 | Phillips | 210/86 |
| 5,236,580 A | 8/1993 | Kelleher | 210/97 |
| 5,248,393 A | 9/1993 | Schumacher et al. | 202/158 |
| 5,431,827 A | 7/1995 | Tatch | 210/767 |
| 5,488,842 A | 2/1996 | Nishioka et al. | 68/13 R |
| 5,520,028 A | 5/1996 | Kim et al. | 68/18 F |
| 5,525,213 A | 6/1996 | Phillips | 210/86 |
| 5,549,831 A | 8/1996 | Bowles et al. | 210/650 |
| 5,595,663 A | 1/1997 | Bowles et al. | 210/652 |
| 5,637,212 A | 6/1997 | Kim | 210/195.1 |
| 5,653,873 A | 8/1997 | Grossman | 210/149 |
| 5,876,567 A | 3/1999 | Yamamoto et al. | 202/160 |
| 6,123,838 A | 9/2000 | Grossman | 210/97 |
| 6,190,558 B1 | 2/2001 | Robbins | 210/652 |

\* cited by examiner

*Primary Examiner*—Ivars Cintins
(74) *Attorney, Agent, or Firm*—Gifford, Krass, Groh, Sprinkle, Anderson & Citkowski, P.C.

(57) ABSTRACT

A treatment and filtration device for use with a wastewater output contaminated with a chemical associated with a dry cleaning operation. An enclosed basin is capable of being filled with a volume of the wastewater for timed treatment. A first elongated module is arranged within the basin at a first location, the first module accomplishing initial filtration of the wastewater and substantial recovery of the chemical contaminant. A second elongated module is arranged within the basin at a second spaced apart location relative to the first module, a series of exterior and porous membranes interconnect the first and second modules as well as inwardly opposing wall edges of the basin proximate the modules and in order to divide the basin into first and second zones. The second module vaporizes a substantial remaining component of the chemical contaminant concurrent with discharging, from the first zone into the second zone, a further filtrated water output. A third elongated module is arranged within the basin at a further specified location within the second zone, a line extends from the second module to the third module, said third module absorbing the contaminant vapor concurrent with venting a residual air discharge. A fourth elongate module is located within the basin in proximity to the third module, a communication passage extending between the third and fourth modules. The fourth module incorporates a zeolitic refinery process for removing additional odorous contaminates from the treated water. A discharge line extends from the fourth module and iteratively discharging treated water from the device.

19 Claims, 7 Drawing Sheets

PORTABLE AND MULTI-STAGE FILTRATION DEVICE FOR REMOVAL OF PERCHLORETHYLENE FROM DRY CLEANING WASTEWATER

BACKGROUND OF THE INVENTION

1. Field of the Invention

The present invention relates generally to filtration devices, particularly those suited for filtering out amounts of perchlorethylene (perc) from dry cleaning wastewater. More particularly, the present invention is directed to a portable and multiple stage filtration device for use with any sized commercial dry-cleaning machine, in particular smaller sized machines. Additionally, the portable filtration device of the present invention provides the combined features of recycling (for reuse) quantities of perchlorethylene derived from the input wastewater, as well as the ability to reduce, through succeeding filtration stages, a remaining concentration of perc and associated odors to such a degree that an effluent discharge of the device can be safely disposed in conventional (drain) manner.

2. Description of the Prior Art

The concept of water treatment and filtration is well known in the art. In particular, a number of existing devices are known in the prior art for the specific purpose of filtering (treating) wastewater from commercial and industrial dry cleaning operations and in order to remove treatment chemicals which become mixed into the water. The most notable type of treatment chemical known in the dry cleaning industry is perchlorethylene (perc), a very dense, heavy liquid which is well suited for conventional dry cleaning procedures, however this toxic waste is a VOC (volatile organic compound). As is also well known, hazardous waste removal of such chemicals can pose a very expensive option to the dry cleaner operator, thus tempting the operator to either invest in expensive filtration equipment or, alternately, tempting the operator to flaunt government regulations in the illegal dumping or otherwise disposal of the perc-laden wastewater.

A first example of a purification system for dry cleaning wastewater is set forth in U.S. Pat. No. 6,123,838, issued to Grossman, and which teaches a three stage purification process. In the first stage, highly contaminated separator wastewater is put into a solvent separator tank. Liquid solvent settles out of the separator waste tank and sinks to the bottom of the separation tank where it accumulates below the separated water. In the second stage, air bubbles are introduced through the separated water, stripping out much of the solvent which is dissolved in the separated water and reducing the dissolved solvent concentration, the air stripping process further disclosing that it extends the useful life of the granulated carbon in the associated filter. Finally, in stage 3, the air stripped water is passed through the granulated carbon filter, resulting in the carbon purified water having a dissolved solvent of less than 0.7 parts per million, as per their claim.

U.S. Pat. No. 5,653,873, also issued to Grossman, discloses another variation of a system and method for reducing dry cleaning wastewater and which combines an air atomization apparatus and a temperature controlled water injection apparatus. The air atomization apparatus disposes of separator water by misting into the air and/or ground, whereas the temperature controlled injection apparatus uses dry cleaning separator water to create and boil an azeotropic mixture in the still of the dry cleaning machine itself.

Finally, U.S. Pat. No. 5,637,212, issued to Kim, discloses a further treatment variant including a collecting tank to collect wastewater from both a dry cleaning machine and a dry cleaning vacuum press which vacuums wastewater and solvent from garments and which remains after completion of the dry cleaning operation. The collected wastewater is pumped through filters and an elevated separation tank, wherein the heavier than water perc separates from the water. The partially purified water then flows through a re-circulation conduit above a separation level in the separation tank and which flows, by virtue of gravity, back down for re-circulation through the filters and then pumped up again to the separation tank for additional filtering and separation of the solvents and other contaminants. In this manner, the wastewater can be recirculated as many times as needed to purify the water, after which it is flowed to a heating chamber for vaporizing and discharge to the atmosphere as steam. Additional types of large scale perc removal equipment are known in the art and particular reference is made to U.S. Pat. No. 4,780,218, issued to Kohler, and U.S. Pat. No. 5,236,580, issued to Kelleher.

SUMMARY OF THE INVENTION

The present invention is directed a portable and multiple stage filtration device for use with any sized commercial dry-cleaning machine, in particular smaller sized machines. In particular, the perc treatment system of the present invention is a particular improvement over the Grossman '838 device in that it provides an enhanced five stage perc removal and odor treatment assembly, and into which is incorporated an element filter, which does not ever have to be changed, into a portable sized unit, typically a fluid holding basin no larger than a five (5) gallon bucket. Additionally, the portable filtration device of the present invention again provides the combined features of recycling (for reuse) quantities of perchlorethylene derived from the input wastewater, as well as the ability to reduce, through the succeeding filtration stages, a remaining concentration of perc and associated odors to such a degree that an effluent discharge of the device can be safely disposed in conventional (drain) manner.

An enclosed basin, typically a five gallon bucket is provided, within which is emplaced a first elongated module is arranged within the basin at a first location. The first module is separated into upper and lower sections, the upper incorporating a porous membrane stack and an element fouler for accomplishing initial filtration of the wastewater for foreign debris and for controlled delivery into the lower section which in turn incorporates a hyper filtration separation (for perc) and filtration process for accomplishing substantial recovery of the chemical contaminant (perchlorethylene).

A second elongated module is arranged within the basin at a second spaced apart location relative to the first module, a series of exterior and porous membranes interconnect the first and second modules as well as inwardly opposing wall edges of the basin proximate the modules and in order to divide the basin into first and second zones for stage III. The second module includes an upper section containing a wet activated carbon, and which may use other suitable materials for this expansion medium.

An element filter is utilized within a lower stage of the second module in order to create a condition for trapping perc and forcing it, in a foaming and vaporous stage, into the upwardly situated expansion medium. The element filter includes both downwardly extending and reverse upwardly extending lines. An air diffuser (air stone) is located in the enlarged reverse line, causing it to foam from the water. Continual action forces significant quantities of the foamy contaminant vapor to be forced upwardly, into the expansion medium, concurrent with the second module discharging, into the second zone of the third filtering stage. Also, by inducing ozone in the element filter it greatly increases the effectiveness of the stage. It also produces an acid that keeps these stages free from fungi; further, ozone is not needed in order for the element filter to work.

A third elongated module is arranged within the basin at a further specified location within the second zone of stage III. A line extends from the second module to the third module (vapor tube), the third module includes a top mounted fan for creating a vacuum pressure through the line in order to draw, from the second module, the contaminant vapor which is absorbed by a dry activated carbon within the third module concurrent with venting a residual air discharge.

A fourth (typically smaller) elongate module is located within the basin in proximity to the third module, a communication passage extending between the third and fourth modules. The lower portion of the third module incorporates a zeolitic refinery process for removing additional odorous contaminates (typically not perc) from the substantially processed wastewater admitted through an opening located in a lower portion of the third module. A discharge line extends from the fourth module and iteratively discharging treated water from the device, such as into a catch bucket.

BRIEF DESCRIPTION OF THE INVENTION

Reference will now be made to the attached illustrations, when read in combination with the following detailed description, wherein like reference numerals refer to like parts throughout the several views, and in which:

FIG. 5 is an enlarged sectional view, again in exploded fashion, of a third generally elongated and filter enclosing modular housing, an upper two-thirds thereof incorporating a dry activated carbon filter, according to a third sub-stage of the filtration stage set forth in FIG. 4 and for receiving an output of the expansion medium. A lower third thereof incorporating a zeolitic refinery process, forming a first sub-stage of a further refining process, and for removing odors such as ammonia and chlorine from the treated water, a fourth generally smaller elongated modular housing being secured in proximity to the third modular housing, forming a second sub-stage of the zeolitic process, and facilitating iterative and incremental effluent controlling water level of stage III and discharge of fully treated wastewater according to the present invention;

DETAILED OF THE PREFERRED EMBODIMENTS

Figure 1:
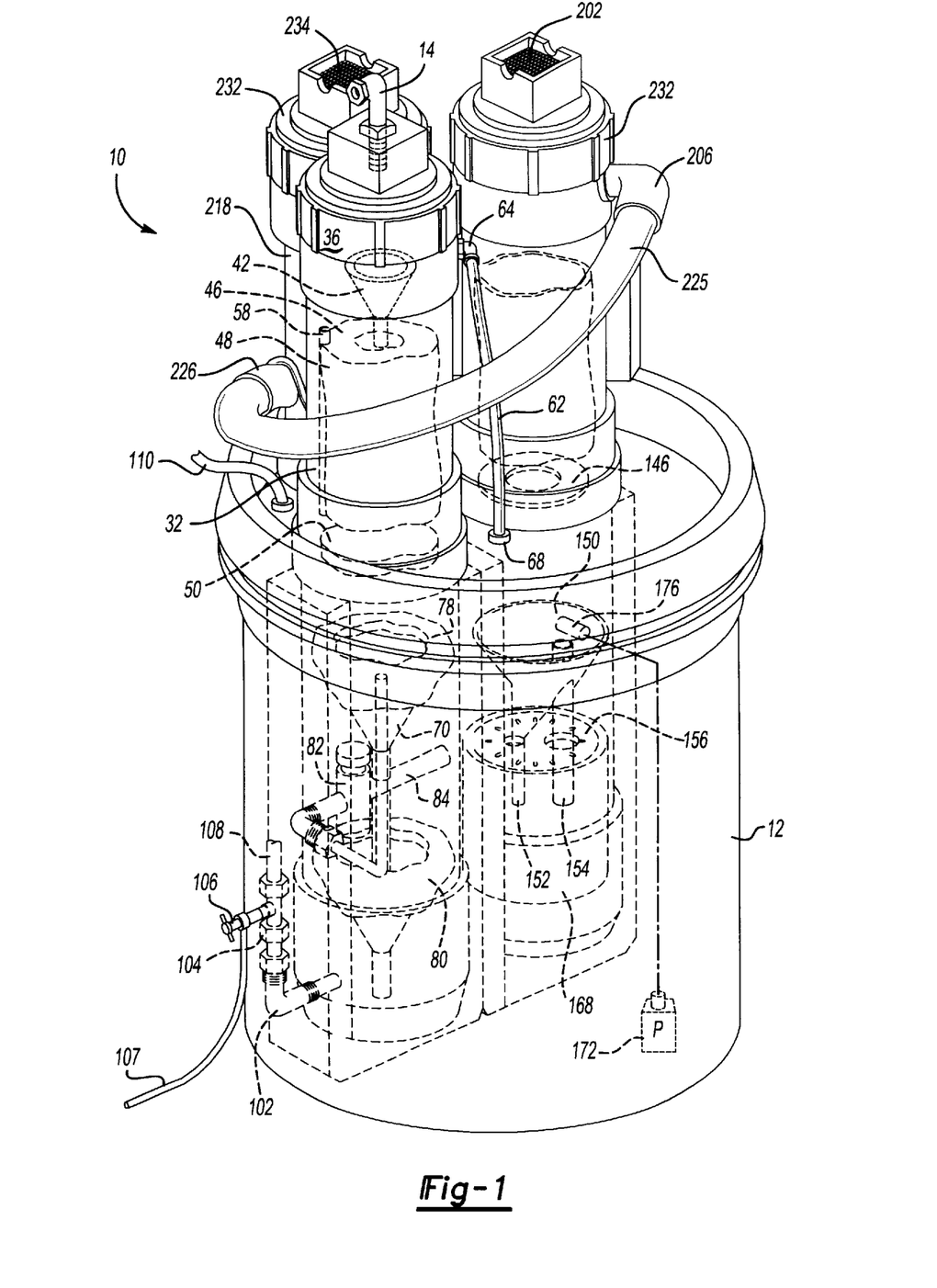
FIG. 1 is a perspective view, illustrated in part in phantom, of the portable and multiple stage perc filtration device according to the present invention.

Referring to FIG. 1, a multiple stage perc removal device is illustrated at according to the present invention. As previously described, the multiple stage filtration device of the present invention is a generally and portable unit, typically fitting within a standard five (5) gallon bucket, and capable of use with any sized commercial dry-cleaning machine, in particular smaller sized machines. Additionally, the portable filtration device of the present invention provides the combined features of recycling (for reuse) quantities of perchlorethylene derived from the input wastewater, as well as the ability to reduce, through the succeeding filtration stages, a remaining concentration of perc and associated odors to such a degree that an effluent discharge of the device can be safely disposed in conventional (drain) manner. A detailed description of the workings of the portable filtration device will now be made.

Figure 2:
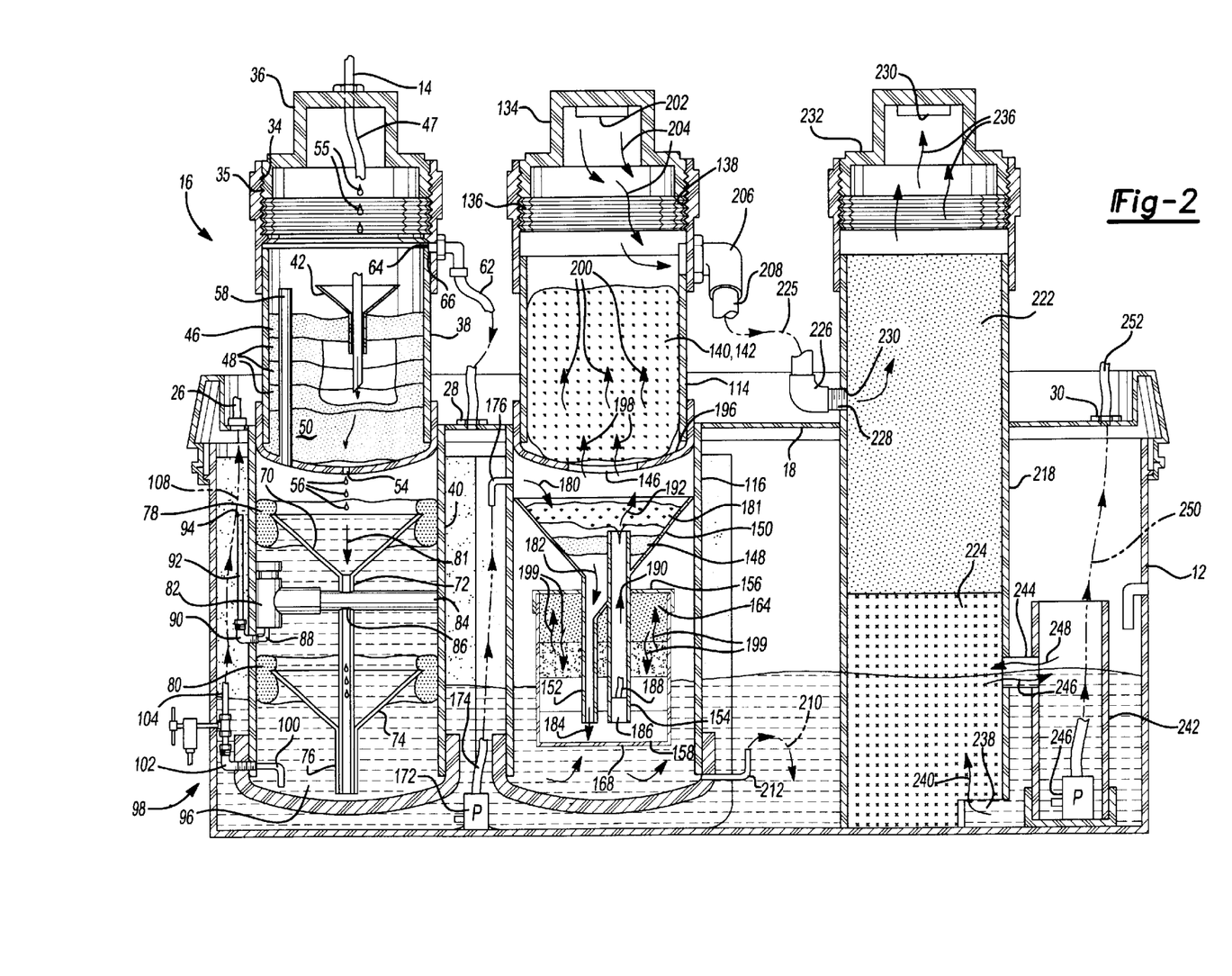
FIG. 2 is an unfolded and structural plan view of the filtration device and which also illustrates the general pattern and direction of the multiple stage water treatment and perc/odor removal according to the present invention.
Figure 3:
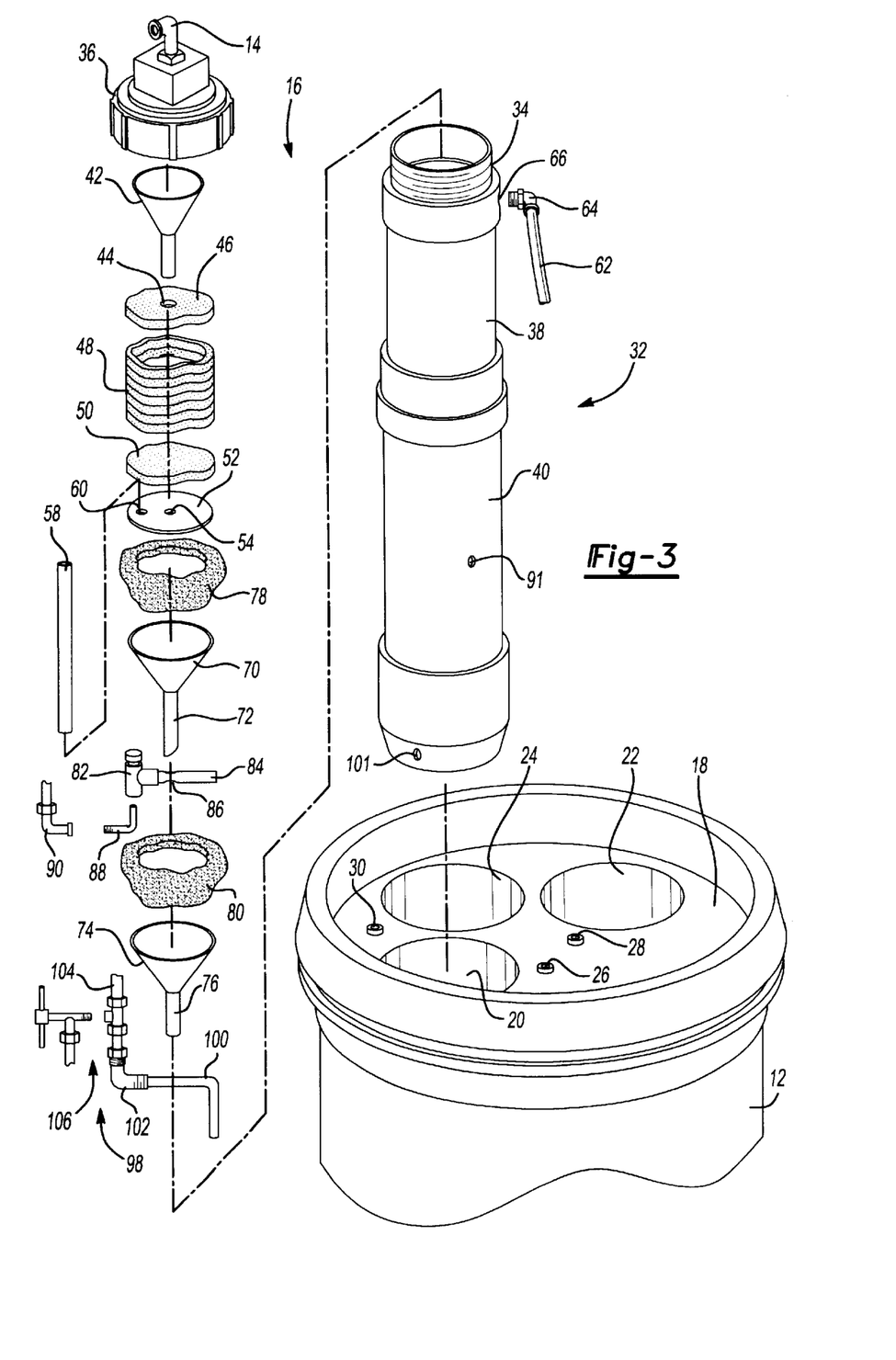
FIG. 3 is an enlarged sectional view, in exploded fashion, of a first generally elongated module incorporating filtration for accomplishing initial filtration of foreign debris and element fouler for controlled delivery and incorporating a hyper filter for perc recycling according to initial treatment stages of the present device.
Figure 4:
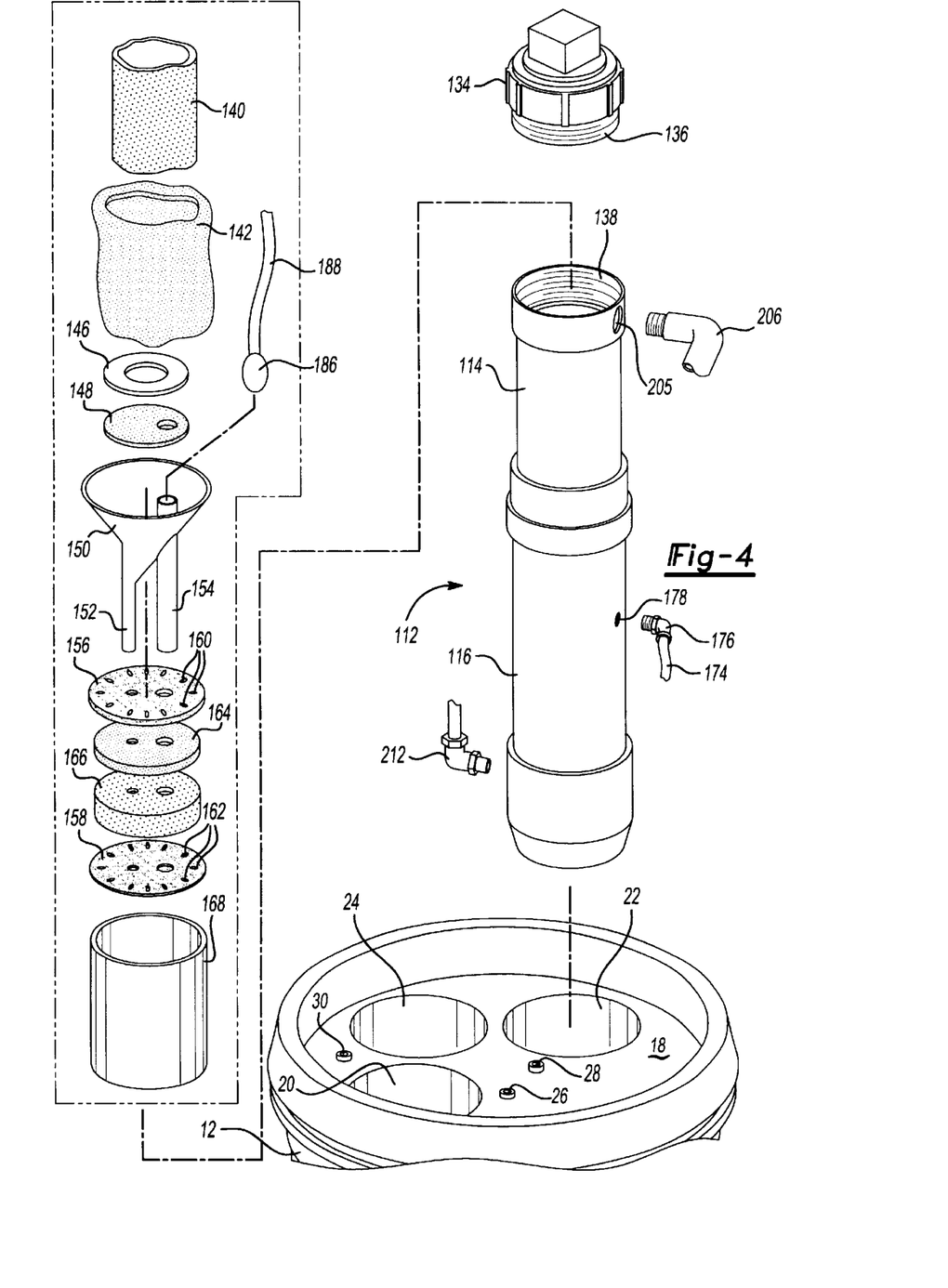
FIG. 4 is an enlarged sectional view, again in exploded fashion, and illustrating first and second sub-stages of a succeeding stage, incorporated into a second generally elongated module, and in which remaining trace elements of perc are further treated and removed through the application of an element filtration procedure and expansion medium filter.

Referring again to FIG. 1, as well as to succeeding FIGS. 2 and 3, the device 10 includes a fluid holding container 12, in the preferred application typically a five (5) gallon bucket. The container 12 defines an open interior basin, capable of receiving a plurality of individual modules incorporating the various filtration stages, as well as being filled with wastewater, this also being interpreted to include pre-filling the basin interior with tap water prior to connecting to the outlet of a conventional dry cleaning machine. As shown in FIGS. 2–4, a fitting 14 (such as a PVC threaded and compression fitting) is provided atop a first elongated module, generally referenced at 16, the fitting 14 fluidly communicating with an outlet line (not shown) extending from the conventional dry cleaning machine and through which volumes of the chemical contaminant (perc) laden wastewater is iteratively discharged.

The first elongated module 16 is best illustrated in the cutaway view of FIG. 2 and exploded view of FIG. 3. As again illustrated in FIG. 3, a top plate 18 may be secured over the container 12 and through which is defined apertures 20, 22, and 24 at specified locations for receiving, in downwardly inserting fashion, selected modules. Also incorporated into the top plate 18 are fitting connections 26, 28 and 30 for permitting communication there through of selected fluid lines as will be subsequently described.

The first module 16 incorporates a first initial filtration stage and secondary gravity separation stage for perc removal/recovery. The module 16, as best shown in FIG. 3, includes an elongated housing, referenced generally at 32, in one variant constructed of a PVC or other suitable material. The housing 32 incorporates a substantially hollow interior and includes, at its upper end, an exteriorly threaded opening 34 which is rotatably engaged by associated and inwardly directed threads (see at 35 in FIG. 2 cutaway) arranged within a (female cleanout) cap 36. The housing 32 may further be subdivided into an upper portion having a smaller diameter (by example 3" PVC round) portion 38 and which is pressure fitted into a lower and enlarged diameter (by example 4" PVC round) portion 40.

The initial, pre-filtration stage, includes a funnel 42, arranged so as to be mounted underneath and generally central the inlet fitting 14 located in the top cap 36. The funnel 42 includes a downwardly extending conduit portion which inserts through an aperture 44 formed in a first filter 46. A particular function of the funnel 42 is to guide the input line (see at 47) upon insertion and through opening 44. An additional stack of interiorly open porous membrane filters are shown at 48, underneath which is located a still further filter 50. The filters 44, 48 and 50 define, collectively, a porous membrane stack and may be constructed of cotton sock (sand filter) and (blue polyfoam) filtering material. A bottom plate 52 is provided with a generally central aperture 54 (element fouler) formed therethrough. The aperture 54 seats an extending end location of the elongated module 40 and, in operation, provides for measured pre-filtration and gravity fed delivery of the wastewater, initially through the porous membrane stack at 55 and to the succeeding perc-retrieval stage at 56 (see in FIG. 2).

In the event of excess fluid flow into the initial filtration stage, not sufficiently offset by the controlled dripping of the contaminant flow 56 through the membrane stack, a run-off line 58 extends from the initial, upper stage, and through a secondary aperture 60 formed in the bottom plate 52. Also, a pressure vent line 62 is attached, by fitting 64, to an aperture 66 (see FIG. 3) located at the upper end of the first module 16. The vent line 62 terminates in a second fitting end which connects to fitting connections 28 located in the top plate 18. In this manner, any excess inlet pressure vented from the dry cleaning machine can be vented directly into the container basin interior, and which can then vent through the third elongated module (and through arrow 248 as will be subsequently described).

Housed within the second, enlarged lower portion 40 of the first module housing 32 is a hyper filter assembly, tension trap, and storage basin which, provides for perc storage and recovery concurrent with discharging the initially treated wastewater into the open basin interior of the container 12. Specifically, the lower housing portion 40 is always filled with water so that the effects of gravity can separate and filter out perc in recoverable and reusable form.

The hyper filtration assembly in the second stage includes a dual funnel arrangement, including an upper funnel 70 with extending conduit 72, the conduit 72 extending through a spaced and succeeding funnel 74 and coaxially seating within an enlarged diameter conduit 76 associated with the second funnel 74. A pair of porous filter membranes, such as a continuous polyester foam, cotton membrane, substantially configured in a flexible, enlarged and annular shape, are provided at 78 and 80 and are arranged over and around the upper rim portions of the spaced funnels 70 and 74 so as to also bias against the inwardly facing wall surface of the first module housing portion 40 (see again cutaway of FIG. 2).

In practice, the wastewater 56, fed from the first, upper pre-filtering stage, passes in a generally downwardly fashion (see arrow 81) in succession through the first and second funnels 70 and 74. Due to the second stage (lower housing portion 40) remaining substantially filled with contaminant fluid. As the wastewater 56 displaces the wastewater 96 (see FIG. 2), the height of the line 92 being understood as controlling the water level in the lower half of the first module 16, the wastewater is forced to flow in an upward direction, through the porous membrane 78. This upward flow, along with the effect of gravity, assists in separating additional perc beyond that which is possible by mere settling (of the perc from the wastewater) within the first module. Additionally, the tension trap 82 utilizes the same concept but adds trapped air to skim the wastewater as it exits through aperture 94. The standing water creates the proper conditions for much heavier (denser) perc contaminant to separate from the water component and to settle in a direction of the bottom of the housing 40.

A tension trap assembly 82 is located generally centrally within the lower housing portion 40 of the first module 32 and includes a cross wise extending and supporting stem portion 84, in turn including an aperture 86 for crosswise extension therethrough of the conduit portion 72 of the first funnel 70 the purpose for which being to support the tension trap in place. As best illustrated in FIG. 2, and after substantial gravity filtration of perc, the substantially pre-filtered water component is forced (through water displacement) through fittings 88 and 90 (see also aperture 91 in housing portion 40, FIG. 3), through a connecting tube fitting 92 and discharged, at 94, into the container basin interior.

The substantially gravity filtered perc component in turn settles into a bottom located portion 96 (see again FIG. 2) of the fluid filled reservoir within the lower portion 40 of the first module 32. An output valve assembly 98 provides for the recovery of perc, in substantially reusable liquid form, and includes a first angled fitting 100, extending through aperture 102 in lower housing portion 40. An extending end of the fitting 100 is secured to the enlarged elbow fitting 102, and an opposite extending end of which receives an outlet conduit 104 and attachable on/off valve 106 (see also perc conduit 107 in FIG. 1) for collecting the denser perc fluid. As also best graphically represented in the cutaway of FIG. 2, a residual dirty water component of the perc retrieval stage further contemplates the provision of a recovery line (see FIG. 1 as well as upwardly extended arrow 108) extending through the fitting 26 in the top plate 18 (FIG. 3) which is sealed and there for services purposes. In this manner, the initial pre-filtering and perc gravity separation stages are performed, at which point a substantial volume of the perc contaminant is removed in fluid form, and such as is capable of recycling use, while the remaining wastewater advance to an intermediate filtration stage.

Referring now to FIG. 4, as well as again to FIGS. 1 and 2, a second elongated module 112 is generally shown. Similarly to the first module 16, the second elongated module 112 may include an upper housing portion 114 and a lower housing portion 116. The second module 112 also provides a substantially hollow interior and may be constructed of PVC or any other suitable material. The second module 112 inserts through an associated aperture 22 in the top plate 18 (concurrent with the placement of the first module 16 within the aperture 20) and in order to arrange the first and second modules within the container basin in a specified spaced apart arrangement.

Figure 7:
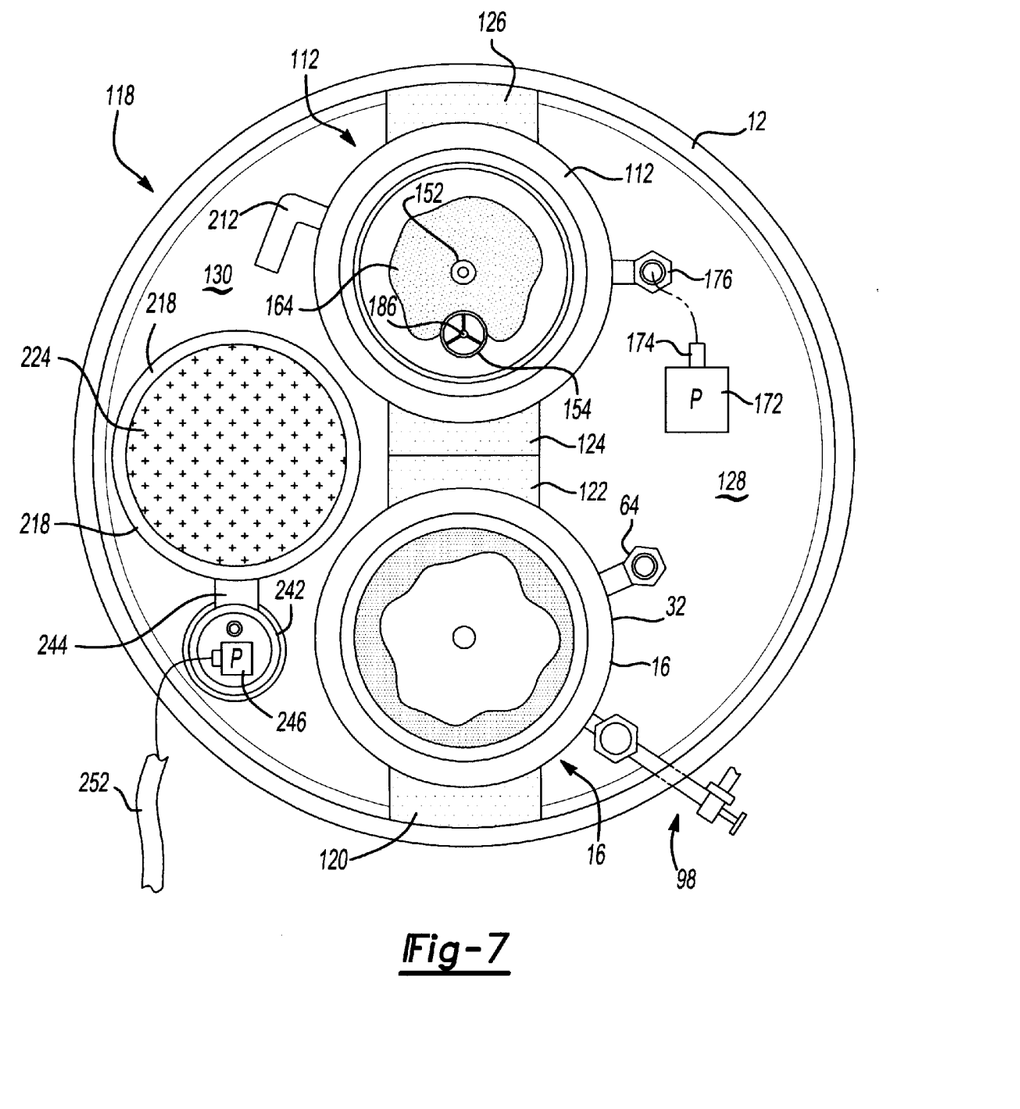
FIG. 7 is a first overhead view of the present device and illustrating the general structural array of the first, second, third and fourth modular housings, within the surrounding fluid holding basin and in combination with the variously located and porous membranes.

Referring further to the top cutaway view 118 of FIG. 7, the first 16 and second 112 modules are shown in place within the basin interior. A series of exteriorly positioned and porous membranes, see at 120, 122, 124 and 126, interconnect the first 16 and second 112 modules as well as inwardly opposing wall edges of the basin defining container 12. The membranes 120–126 can also be constructed of a blue foam and cotton sock filter or from any other suitable type of filter which permits a desired degree of fluid passage. In this manner, the first and second modules 16 and 112, combined with the membranes 120–126, subdivide the basin interior into a first zone 128 and a second zone 130. In practice, the first zone 128 operates as an initial sub-stage of a succeeding third stage of the overall filtration process, the second zone 130 operating as a succeeding sub-stage of the third stage. Further explanation of the contaminant filtration aspects existing within the fluid filled basin exterior (this including the ability to continuously recirculate filtered wastewater from the second zone 130 back to first zone 128, and outside of the filtration procedures performed within the various modules) will be subsequently made in a detailed explanation of the operation of the present invention.

Referring back to FIG. 4, a cap 134 is provided with external threads 136 for seating and rotatably engaging over suitable, opposing and inwardly directed threads 138 defined at a top end of the second module 112. The second elongated module 112 of FIG. 4 defines first and second sub-stages of a succeeding fourth stage in the overall filtration (water treatment) process and in order to withdraw a significant portion of the remaining perc content in the pre-filtered water existing at that point within the first zone 128 of the container basin interior through stage 4 and concurrent with discharging the substantially perc free water into the second zone 130.

As best shown in FIG. 4, and housed within the upper portion 114 interior of the second module 112, is an expansion medium arrangement of a wet activated carbon medium 140 and an encircling cotton sock filter 142, the latter acting as a pouch for containing the wet carbon medium 140. The module 114 and module 116 are separated by a passage 146.

Incorporated into the lower housing portion 116 of the second module 112 are the components of the element filter which initially filters wastewater, is pumped in for re-circulating into the second module, concurrent with foaming the contaminant and successively driving it upwardly into the wet activated carbon medium 140 (expansion medium) located in the upper housing portion 114 of the second module 112. The element filter assembly further includes a modified funnel arrangement 150 and which in turn includes a connected and downwardly extending line 152 and a separately attached, upwardly extending, return line 154 which empties back into the upper funnel 192, as seen in FIG. 2.

The construction of the debris filter 148, such as by the hollow central interior of the foam filter and aperture formed in the debris filter, permit the filter 148 to be stacked within the funnel 150 in the manner shown in FIG. 2. Located underneath the funnel 150 are a pair of opposed and spaced rigid plastic plates 156 and 158, each of which include apertures for seating both the extending 152 and return 154 conduit portions associated with the funnel arrangement, combined with additional apertures (see at 160 and 162) for permitting fluid passage therebetween. A pair of additional mediums are sandwiched between the plates 156 and 158, these including a (blue) foam 164 and activated carbon medium 166 and are here to displace water in the element filter, both of which again include the necessary apertures for allowing passage therethrough by the extending 152 and return 154 conduit portions. The modified funnel arrangement 150 as well as the lower situated mediums, are all housed within a surrounding and closed bottom cylindrical basin 168. The element filter in whole suspended within a generally upper location of the lower housing portion 116 (see again FIG. 2) to maintain a different water level than in stage III. The water level atop of funnel 150 controls the water output from basin 168 and discharges substantially filtered water into a bottom location of the second module 116 and in a manner to be now explained.

An inflow of fluid into the second module 112, from the first sub-zone 128 of the container basin, is accomplished by a first pump 172, it being understood that both pumps 172 and 246 operate through Venturi effect, such as may be located within the basin interior, and which communicates with a line 174 terminating in a fitting 176 engageable with an aperture 178 located at a generally central location within the second module 112. At this point, and referring again to FIG. 2, the inlet flow (see arrow 180 in FIG. 2) is drawn into the funnel 150, through the debris filters 148, and down (arrow 182) through the initially extending line 152 to a substantially bottom location (arrow 184) within the closed cylindrical basin 168.

The element filter according to a second sub-stage of this fourth overall stage is elevated within the lower half of the module 112 sufficient to permit the water level to be higher within the basin 168 than the associated water level within the bucket (stage III). The element filter further includes the provision of an air diffuser/air stone (186) arrangement and in which the fluid flow is foamed (see represented at 181 in FIG. 2) and upwardly returned through the return line 154 and in a reverse and upward direction proximate the top of the funnel 150 and in communication with the wet activated carbon medium 140 located in the upper housing portion 114. The air stone is illustrated at 186 in FIGS. 2 and 4 and further includes a line 188 which is connected to a second air infusion pump (not shown). The air stone 186 is located within the second return line 154 and operates to induce the water flow in an upward direction and at approximately twice the flow rate as the initial downward travel of the flow along line 152.

The air stone 186 operates to force the introduced air through the rock portion of the air stone, thereby generating an upwardly directed flow to the fluid, in combination with foaming the upward return flow. Reference is made to arrows 190 and 192 in FIG. 2, at which point the foamed return flow is located proximate the opening 146 in the bottom of a divider member 196 separating the lower situated element filter from the upper situated expansion medium.

Continuous swirling action within the funnel 150, combined with the air diffusion created by the air stone, combines to draw the fluid flow through the lines 152 and 154 and as the pump 172 continuously pumps into inlet 176, the water level in funnel 150 raises to the point where its weight overcomes the downward force (see 197 in FIG. 2) which "pulls" the perc out; then follows arrows 199 to the discharge 160 on plate 156 (through the medium displacement 164 and 166). At this point, the operation of the air stone causes an upward flow of the foamed contaminant into the wet activated carbon medium (see directional arrows 198 and 200). Concurrently, the upward flow creates an equal downwardly pulling force, forcing the contaminant to drip back downwardly and trapping the perc in the basin 168 and until the upward flow pulls it up and suspends it again in the foam. By introducing ozone through the air stone, it produces acidic buildup to assist in separating from the wastewater, but which is not required in every embodiment. From there, it is sucked upwardly, such as by capillary action, into the expansion medium.

The continuous operation of the element filter, wet activated carbon 140 in the upper sub-stage, causes the foamable fluid with entrapped perc to be rendered to a substantially vaporous stage and incrementally pushed upwardly within the upper housing portion 114 of the second module 112. From there, a fan 202 located in a vented top portion (see also FIG. 1) of the second module 112 draws in external air (along arrow directions 204 as shown in FIG. 2) and out through a fitting 206 (see also aperture 205 in FIG. 4 in upper portion 116 of second module 112 and to which the fitting 206 engages) and extending line 208, such as a hose (vapor tube) connected to the fitting 206. Concurrently, the now substantially perc free water is expelled through an outlet (see arrow 210 out line 212 in FIG. 2) defined proximate the bottom of the second module 112 and into the second zone 130 created within the container basin stage III. In operation of a preferred embodiment, the second module 112 draws in fluid from first zone 128 at a rate of approximately one-quarter gallons per hour for filtration within the element filter of the stage four filtration process of FIG. 4.

Figures 5, 6:
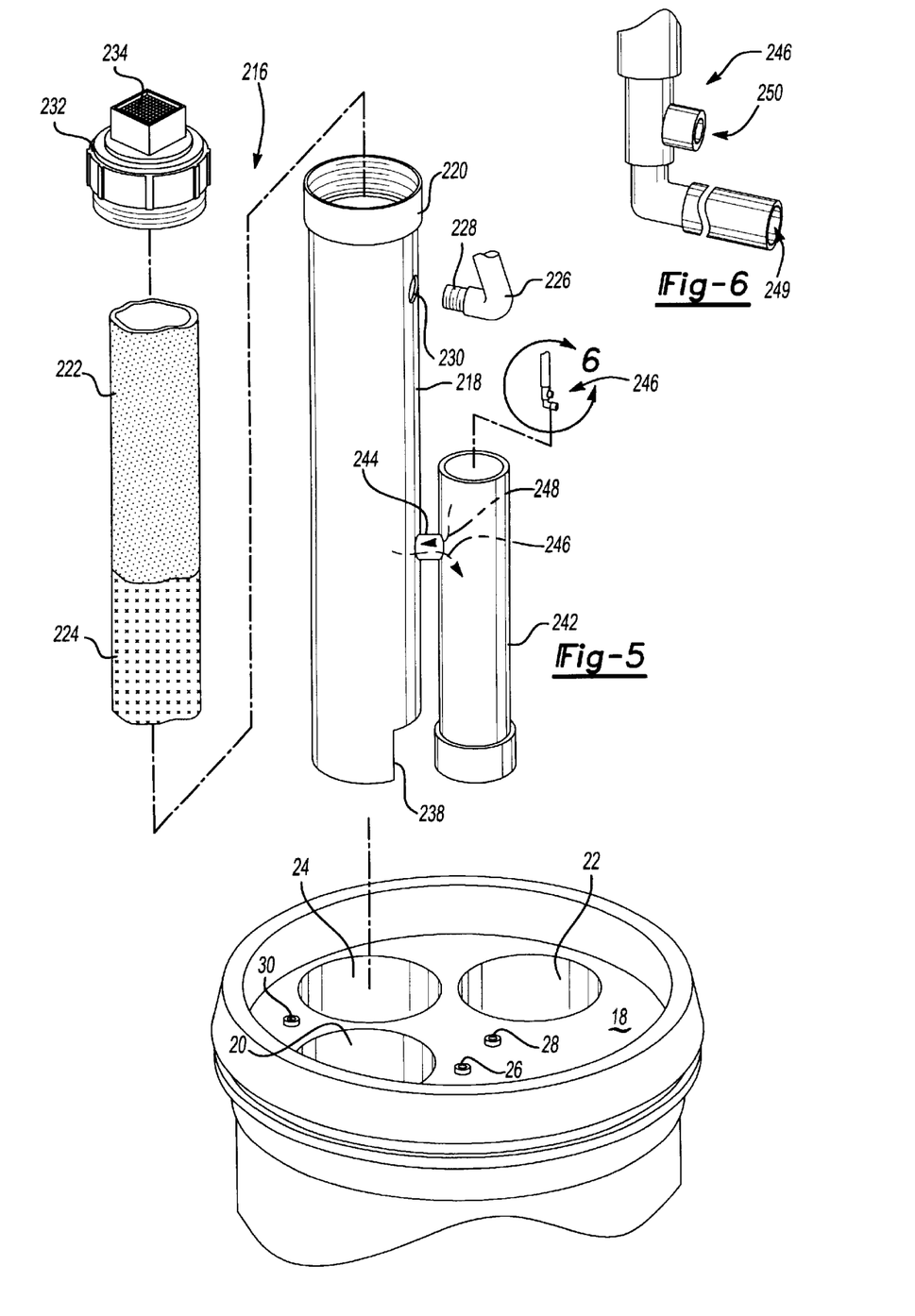
FIG. 6 is an enlarged partial view of a pump associated with the fourth module housing and for use in iteratively and incrementally advancing and discharging the treated wastewater according to the present invention.

Referring now to FIG. 5, an exploded view is illustrated at 216 of a third elongated module 218 and which is insertable through the aperture 24 defined at the further location of the top plate 18, in order to located the third module 216 at a further specified location within the second zone 130 of the container basin interior. A top 220 of the third module 218 allows for axial insertion of a combined filter medium, substantially identified as a two-third upper extending portion of dry activated carbon 222 and a connected, and lower extending portion 224 of wet zeolitic. The line 208 (vapor tube), extending from the second module 112, and referenced by arrow 225 in FIG. 2, terminates in an elbow 226 with extending fitting 228, the fitting in turn securing through an aperture 230 defined at an intermediate location within the third module 218, just above lid 18, and in communicable fashion with the dry activated carbon 222 component of the combined filter.

An additional fan (typically a 12V fan and such as is schematically represented at 230 in FIG. 2) is located at the top end of an attachable cap 232 and further includes a vent 234 which, upon activating, draws the vapor through the line 225 and into the dry activated carbon 222 (this in turn defining a third sub-stage of the overall fourth stage process of the second module 112 in FIG. 4). The dry activated carbon is capable of absorbing and holding the substantially remaining perc vapors, concurrent with the fan causing the residual air to be vented along directional lines 236 (again FIG. 2).

The lower portion of the third module 218, including the area housing the zeolitic material 224, operates as a further, and fifth stage for treating the perc filtered water in a final step and in order to substantially lower odorous compounds such as chlorine and ammonia; it further being understood that levels of perc are not removed at this stage. However, some alternate variants may contemplate additional levels of perc removal within the scope of the present invention. Odor reduction is otherwise accomplished through the provision of a zeolitic refinery process, utilizing a granulate type zeolitic material, and is described as follows.

An inlet 238 is defined at the bottom of the third module 218 and draws in fluid (see directional arrow 240 in FIG. 2). This is caused by a fourth elongated but reduced length module 242, connected to the third module 218 in fluid communicable fashion by an elevated and cross wise extending conduit portion 244. A third pump, referenced generally at 246, is located at a base of the fourth module 242. Referring to the enlarged partial view of FIG. 6, the third pump 246 is incorporated into a series of inlet fittings (see at 249 and 250).

In operation, the zeolitic process operates by the fluid 240 first being drawn into the bottom situated inlet 238 in the third module 218. Upon reaching an elevation equal with the fluid communicating and interconnecting conduit 244, the fluid has been substantially drawn through the zeolitic 224 and communicates (see arrow 246 in FIG. 2) with the fourth module 242, wherein it descends to the bottom of the module 242. It is also contemplated that some reverse flow of vented air (see also arrow 248) may occur, and in which the vented perc vapors resulting from the dry cleaning machine may be reabsorbed into the dry activated carbon 222 for additional filtration.

Upon a determined elevation existing within the fourth module 242, the pump 246 is continuously activated and causes the further odor processed and fully treated water to be discharged, through a line (see directional arrow 250) to a point exterior of the bucket (see further discharge line 252 extending from associated fitting connection 30). A separate container (not shown) such as a catch bucket can be employed to catch the iterative discharge and which may be then disposed of in conventional and safe fashion, such as pouring down a sewage drain.

Figure 8:
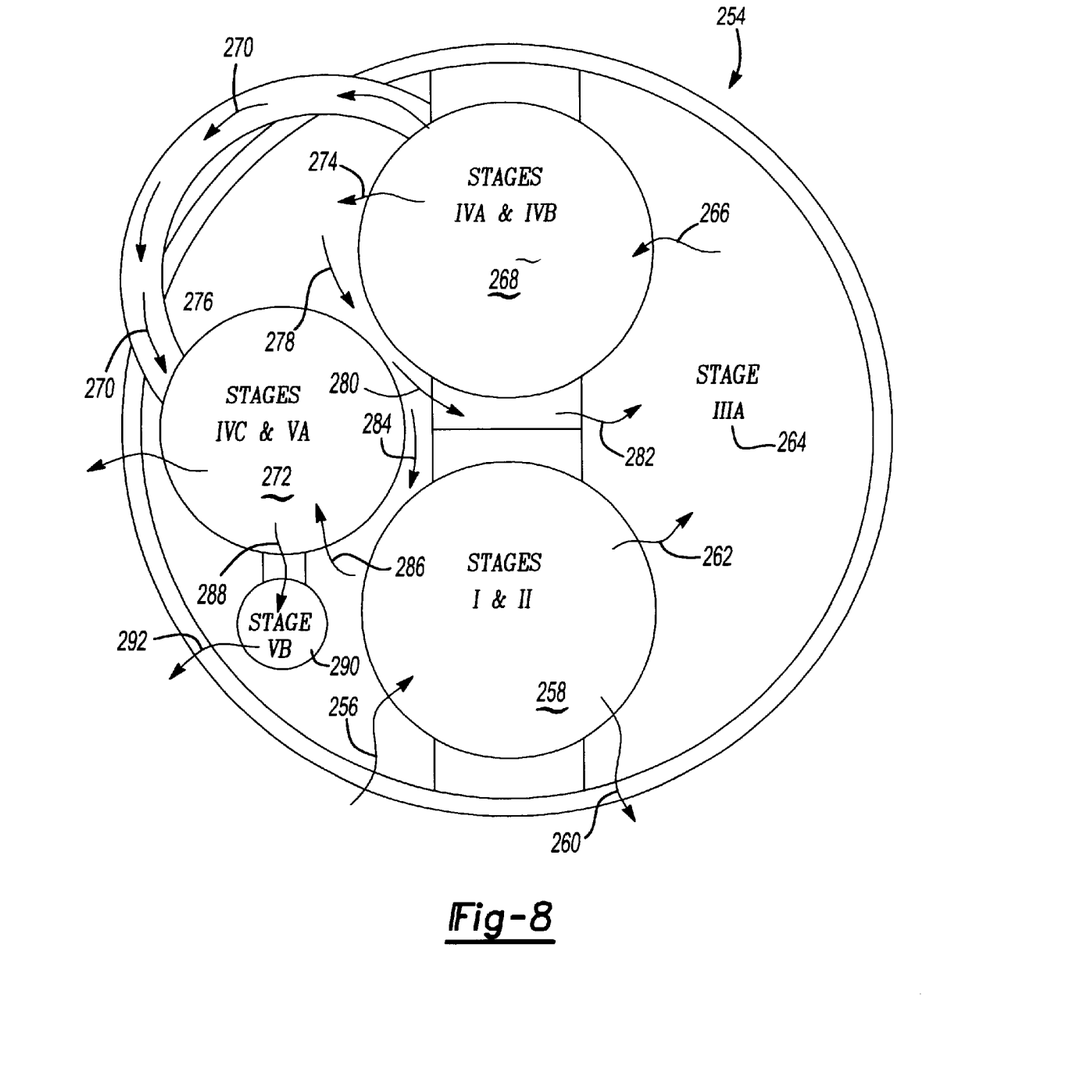
FIG. 8 is a second overhead view, similar to that illustrated in FIG. 7, and illustrating, in generally schematic manner, the pattern of flow of the wastewater throughout the filtration device according to the present invention.

Referring finally to FIG. 8, a general overhead schematic 254 (similar to FIG. 7) is shown and which illustrates the overall flow of the contaminant fluid throughout the treatment and filtration device of the present invention. Specifically, and as has been previously explained, the container is pre-filled with water and connected to the dry cleaning machine. A 112V power source (not shown) operates the pumps and fans of the present device and is likewise plugged in again for continuous operation.

Reference arrow 256 schematically illustrates the inlet flow of the wastewater into the first elongated module (this again representing an iterative input from the dry cleaning operation). Reference 258 illustrates the successive pre-filtering and gravity separation stages conducted within the first module, the result of which is the retrieval of perc (260) in substantially reusable form, combined with the discharge (262) of the intermediate filtered and contaminant water into the first subdivided zone of the basin interior (identified here as stage IIIA 264).

As indicated by arrow 266, the intermediate filtered wastewater is drawn into the second elongated module 268, at which point the element filter and expansion medium, engages in further perc removal. The substantially vaporized perc is then communicated along arrows 270 to the upper third sub-stage portion of the third module 272 while, concurrently, the additionally filtered wastewater is introduced, at 274, into the second subdivided zone of the basin interior (identified here as stage IIIB 276).

Recirculation of fluid between stages IIIB and IIIA is referenced by directional arrows 278 (second zone), arrows 280 and 282 (passing across porous membranes connecting first and second modules and opposing inwardly directed walls of basin interior) and re-admixing within the first zone. In this fashion, recirculation of the filtered water coming from the second module occurs as a separate and continuous process and in order to further reduce the contaminant levels existing in the first subdivided zone of the basin interior.

Referring again to the second subdivided zone (again stage IIIB) arrow 284 references a separate flow current originating from the effluent 274 of the second module, and which in turn travels to arrow 286, at which the substantially perc treated fluid is admitted into the lower housing portion of the third module 272 (this again defining an initial sub-stage of the zeolitic refinery process). Operation of the pump located in the fourth module causes fluid to be drawn across the communicating conduit portion (see arrow 288) and into the fourth module 290. Iterative discharge is finally indicated by arrow 292 (discharge line) and in which the outlet flow is fully treated and ready for conventional disposal.

Advantages of the present invention include it being virtually maintenance free, inexpensive to operate and inexpensive to maintain with no expensive filters to change and very low power input. Another aspect of the treatment and filtration device is its ability to operate around the clock and, accordingly, to contain and treat the wastewater up to two days or more before being fully treated and discharged for safe disposal.

Having described my invention, additional preferred embodiments will become apparent to those skilled in the art to which it pertains, and without deviating from the scope of the appended claims.

I claim:

1. A treatment and filtration device for use with a wastewater output contaminated with a chemical associated with a dry cleaning operation, said device comprising:
    a basin capable of being filled with a volume of the wastewater output;
    a first elongated module arranged within said basin at a first location, said first module including at least one filter for initially filtering the wastewater and to recover the chemical contaminant;
    a second elongated module arranged within said basin at a second spaced apart location relative to said first module, a series of exterior and porous membranes interconnecting said first and second modules, as well as inwardly opposing wall edges of said basin proximate said modules, said membranes dividing said basin into first and second zones, said second module incorporating structure for vaporizing a substantial remaining component of the chemical contaminant concurrent with discharging, from said first zone into said second zone, a further filtrated wastewater output;
    a third elongated module arranged within said basin at a further specified location within said second zone, a line extending from said second module to said third module and drawing said contaminant vapor into said third module, said third module incorporating structure for absorbing said contaminant concurrent with venting a residual air discharge; and
    a fourth elongate module arranged within said basin in proximity to said third module, a communication passage extending between said third and fourth modules, a zeolitic refinery process located within said fourth module removing additional odorous contaminates from said wastewater, a line extending from said fourth module and iteratively discharging treated water from said device.

2. The device as described in claim 1, said first elongated module further comprising a first upper stage portion and a second lower stage portion.

3. The device as described in claim 2, said upper stage portion further comprising a membrane stack for filtering debris and an element fouler for controlling passage of said wastewater as it is downwardly fed by gravity to said lower stage portion.

4. The device as described in claim 3, further comprising a pressure vent/overflow line extending from said first upper stage portion into said basin.

5. The device as described in claim 2, said second lower stage portion further comprising dual and interconnected funnel elements, each of said elements including an encircling and porous membrane biasing against inwardly facing surfaces of said first module, said funnel elements providing gravity separation of fluid contaminant from the wastewater.

6. The device as described in claim 5, said second lower stage portion further comprising a first fluid contaminant retrieval line and a second wastewater outlet line.

7. The device as described in claim 6, the chemical contaminant exhibiting a higher specified density than the wastewater, a tension trap in said second lower stage portion of said first module causing a downward gravity separation of the contaminant, concurrent with wastewater flowing upwardly through said outlet line.

8. The device as described in claim 1, further comprising circulation means for recirculating said wastewater in said second zone across said porous membranes and into said first zone.

9. The device as described in claim 8, said circulation means further comprising a first pump located in said first zone and for drawing wastewater into said second module.

10. The device as described in claim 9, second module further comprising a perc trapping element filter, said element filter including an expansion medium, a lower filtration sub-assembly, and an upper filtration subassembly.

11. The device as described in claim 10, said perc trapping element filter further comprising a generally funnel-shaped element incorporating foam and solid mediums, a first downwardly extending line extending from said element filter along with a corresponding second and upwardly directed return line, said lower filtration sub-assembly further including additional foam and activated carbon mediums.

12. The device as described in claim 11, further comprising a second pump activated air diffuser incorporated into said return line, said air diffuser creating an upward return and foamable flow of wastewater, initially fed through said first downwardly extending line, said upper filtration sub-assembly further comprising a wet activated carbon through which is forced said foamable flow expanding said foamable flow into said vapor.

13. The device as described in claims 11, further comprising said upwardly directed return line of said perc trapping element filter creating a fluid flow twice that of said downwardly extending line.

14. The device as described in claim 1, said third module further comprising an upper portion housing a dry activated carbon filter for absorbing said contaminant vapor, said module further comprising a lower portion housing a zeolitic filter.

15. The device as described in claim 14, said discharge line further comprising a third pump located in said fourth module for drawing substantially treated wastewater into said lower portion of said third module and expelling the treated water upon a water level established between said third and fourth modules rising above a specified level.

16. The device as described in claim 14, further comprising a vent fan incorporated into a top location of said third module for drawing and venting said residual air discharge.

17. The device as described in claim 1, the basin being constructed of a generally cylindrical shaped bucket of specified volume holding capacity, the chemical contaminant further comprising perchlorethylene, the odorous contaminants removed by said zeolitic refinery process including ammonia and chlorine.

18. A multi-stage treatment and filtration device for use with a wastewater output contaminated with a chemical associated with a dry cleaning operation, said device comprising:

a basin capable of being filled with a volume of the wastewater output;

a first elongated module arranged within said basin and incorporating a pre-filtration stage having a porous membrane stack and an element fouler for providing for controlled flow of the wastewater within said first module, said first module further including a succeeding gravity separation stage for isolating and recycling, in liquid form, a majority of the chemical contaminant;

a second elongated module arranged within said basin at a second spaced apart location relative to said first module, a series of exterior and porous membranes interconnecting said first and second modules, as well as inwardly opposing wall edges of said basin proximate said modules, said membranes dividing said basin into first and second zones, said second module including a contaminant trap and vaporization stage;

a third elongate module arranged within said basin within said second zone, a communication line extending from said second module and drawing the contaminant vapor into said third module, said third module including a contaminant absorption filter and residual air discharge stage; and a fourth elongated module arranged within said basin in proximity to said third module, a communication passage extending between said third and fourth modules, said fourth module including an odor removal stage, a line extending from said fourth module and iteratively discharging treated water from said device.

19. A treatment and filtering device for use with a wastewater output of a dry cleaning machine, comprising:

a basin filled with a volume of the wastewater output;

a first module arranged at a first location within the basin and including means for substantially recovering the chemical contaminant in reusable form;

a second module arranged at a second location within the basin, a series of exterior and porous membranes interconnecting said first and second modules, as well as inwardly opposing wall edges of said basin proximate said modules, said second module further including vaporization means for trapping and vaporizing a substantially remaining component of the chemical contaminant concurrent with discharging, from a first zone defined within the basin to a second zone, a further filtrated wastewater output; and said device further including iterative discharge means for discharging treated water.

* * * * *